(12) United States Patent
Mathon et al.

(10) Patent No.: US 12,407,570 B2
(45) Date of Patent: Sep. 2, 2025

(54) SYSTEMS AND METHODS FOR CONFIGURING NETWORKING DEVICES

(71) Applicant: OVH, Roubaix (FR)

(72) Inventors: Gautier Mathon, Wasquehal (FR); Clement Sciascia, Mouvaux (FR); Stanislaw Zielinski, Radwanice (PL)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 18/609,435

(22) Filed: Mar. 19, 2024

(65) Prior Publication Data
US 2024/0323082 A1    Sep. 26, 2024

(30) Foreign Application Priority Data
Mar. 22, 2023  (EP) ..................... 23305390

(51) Int. Cl.
| | |
|---|---|
| H04L 29/06 | (2006.01) |
| H04L 9/40 | (2022.01) |
| H04L 12/24 | (2006.01) |
| H04L 41/0816 | (2022.01) |
| H04L 41/28 | (2022.01) |

(52) U.S. Cl.
CPC ...... *H04L 41/0816* (2013.01); *H04L 63/0236* (2013.01); *H04L 63/101* (2013.01); *H04L 63/1458* (2013.01)

(58) Field of Classification Search
CPC ............. H04L 41/0816; H04L 63/0236; H04L 63/101; H04L 63/1458; H04L 29/06; H04L 12/24; H04L 41/28
USPC .......................................................... 709/221
See application file for complete search history.

(56) References Cited

U.S. PATENT DOCUMENTS

| | | |
|---|---|---|
| 2012/0216282 A1 | 8/2012 | Pappu et al. |
| 2016/0028755 A1 | 1/2016 | Vasseur et al. |
| 2016/0219065 A1 | 7/2016 | Dasgupta et al. |
| 2016/0226913 A1* | 8/2016 | Sood ...................... G06F 21/577 |
| 2016/0373474 A1* | 12/2016 | Sood ....................... G06F 21/53 |

OTHER PUBLICATIONS

European Search Report with regard to the EP Patent Application No. EP 23305390.9 completed Aug. 22, 2023.

* cited by examiner

*Primary Examiner* — Jude Jean Gilles
(74) *Attorney, Agent, or Firm* — BCF LLP

(57) ABSTRACT

A method and system for configuring networking devices in a network having a local layer and a global layer. An indication of a network attack is received at the local layer. A configuration change corresponding to the attack is stored in a database of the local layer. The configuration change is sent to a device in the global layer. The device in the global layer stores the configuration change in a database of the global layer. Configuration changes are generated for the networking devices and sent to the networking devices. The configuration changes applied to the networking devices are stored in the global layer.

12 Claims, 5 Drawing Sheets

SYSTEMS AND METHODS FOR CONFIGURING NETWORKING DEVICES

CROSS-REFERENCE

The present application claims priority to EP application Ser. No. 23/305,390.9, filed Mar. 22, 2023, entitled "SYSTEMS AND METHODS FOR CONFIGURING NETWORKING DEVICES", the entirety of which is incorporated herein by reference.

FIELD OF TECHNOLOGY

The present technology relates to systems and methods for managing and/or modifying the configuration of networking devices.

BACKGROUND

A network may include various networking devices for managing traffic within the network, such as routers, switches, firewalls, and/or other networking devices. The networking devices may come from different vendors, run different operating systems, have different roles, have different configurations, and/or otherwise be different from each other. In order to make a change to how the network routes or filters traffic, multiple networking devices may be reconfigured. Because of the differences between these networking devices, a different configuration change may be performed on each of the different devices. Because of these differences it may be difficult and time consuming to make changes to a network with a large amount of networking devices.

Due to the growing usage of cloud computing, more and more Internet services rely on cloud providers to ensure the availability of their services. Malicious attempts to disrupt a server, service or network are an ongoing threat against service availability. Denial of Service (DOS) attacks and Distributed Denial of Service (DDOS) attacks are ones of the most widespread types of attacks, against networks.

A botnet including a large number of bots can be used to cause a DoS, DDOS, or other type of attack on a network. A DoS or DDOS attack causes the network to be flooded with superfluous requests. When under such an attack, the network may become so overloaded that services being hosted on the network might not be able to properly communicate with legitimate users and clients.

Conventional mitigation solutions are slow to react to these types of attacks. Although some solutions have been shown to react within 30 seconds, this delay may actually exceed the duration of an attack, in which cases the mitigation is essentially fruitless.

It is an object of the present technology to ameliorate at least some of the limitations present in the prior art.

SUMMARY

Implementations of the present technology have been developed based on developers' appreciation of shortcomings associated with the prior art.

According to a first broad aspect of the present technology, there is provided a method for configuring a plurality of networking devices in a network having a local layer and a global layer, the method comprising: receiving, at the local layer, an indication of a denial of service (DOS) attack directed at a system within the network; storing, in a database of the local layer, a configuration change corresponding to the DOS attack; sending, by a streamer device of the local layer and to a controller device of the global layer, the configuration change; storing, by the controller device, the configuration change in a database of the global layer, wherein the database of the global layer comprises stored configurations of the plurality of networking devices connected to the network; generating, by the controller device and based on the stored configurations in the database of the global layer, a plurality of configuration changes to send to the plurality of networking devices; storing, in the database of the global layer, the plurality of configuration changes; and sending, by the controller device of the global layer and to the plurality of networking devices, the plurality of configuration changes.

In some implementations of the method, the method further comprises: determining that a configuration change of the plurality of configuration changes caused an error at a networking device of the plurality of networking devices; retrieving, by the controller device and from the database of the global layer, a prior configuration of the networking device; and causing, by controller device, the networking device to revert to the prior configuration.

In some implementations of the method, the plurality of configuration changes comprise an address to add to a blacklist.

In some implementations of the method, the plurality of configuration changes comprise profile updates for the plurality of networking devices.

In some implementations of the method, the plurality of configuration changes cause incoming traffic corresponding to the address to be directed to one or more mitigation devices.

In some implementations of the method, receiving the indication of the DOS attack comprises receiving user input indicating that a DOS attack is occurring.

In some implementations of the method, the streamer is configured to send any changes that are made to the database of the local layer to the controller device of the global layer.

In some implementations of the method, generating the plurality of configuration changes to send to the plurality of networking devices comprises, for each networking device of the plurality of networking devices: retrieving, from the database of the global layer, a current configuration of the respective networking device, and determining, based on the current configuration of the respective networking device and based on the configuration change in the database of the global layer, a device-specific configuration change to be applied to the respective networking device.

In some implementations of the method, sending the plurality of configuration changes to the plurality of networking devices comprises sending, to a plurality of drivers associated with the plurality of networking devices, the plurality of configuration changes.

In some implementations of the method, the method further comprises applying, by the plurality of drivers, the plurality of configuration changes to the plurality of networking devices.

According to another broad aspect of the present technology, there is provided a method for configuring a plurality of networking devices in a network having local layers and a global layer, the method comprising: detecting incoming traffic corresponding to a denial of service (DOS) attack directed at a system within the network; storing, by a controller device of the global layer, a configuration change in a database of the global layer, wherein the database of the global layer comprises stored configurations of the plurality of networking devices connected to the network; sending, by a streamer device of the global layer and to a controller devices of the local layers, the configuration change; generating, by the controller device of the global layer and based on the stored configurations in the database of the global layer, a plurality of configuration changes to send to the plurality of networking devices; storing, in the database of the global layer, the plurality of configuration changes; and sending, by the controller device of the global layer and to the plurality of networking devices, the plurality of configuration changes.

In some implementations of the method, the method further comprises: determining that a configuration change of the plurality of configuration changes caused an error at a networking device of the plurality of networking devices; retrieving, by the controller device and from the database of the global layer, a prior configuration of the networking device; and causing, by controller device, the networking device to revert to the prior configuration.

In some implementations of the method, the plurality of configuration changes comprise an address to add to a blacklist.

In some implementations of the method, the plurality of configuration changes comprise profile updates for the plurality of networking devices.

In some implementations of the method, the plurality of configuration changes cause incoming traffic corresponding to the address to be directed to one or more mitigation devices. In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

According to another broad aspect of the present technology, there is provided a method for configuring a plurality of networking devices in a network having a local layer and a global layer, the method comprising: storing, in a database of the local layer, a configuration change corresponding to the network; sending, by a streamer device of the local layer and to a controller device of the global layer, the configuration change; storing, by the controller device, the configuration change in a database of the global layer, wherein the database of the global layer comprises stored configurations of the plurality of networking devices connected to the network; generating, by the controller device and based on the stored configurations in the database of the global layer, a plurality of configuration changes to send to the plurality of networking devices; storing, in the database of the global layer, the plurality of configuration changes; and sending, by the controller device of the global layer and to the plurality of networking devices, the plurality of configuration changes.

According to another broad aspect of the present technology, there is provided a system for network configuration, the system comprising a controller and a memory storing a plurality of executable instructions which, when executed by the controller, cause the system to receive, at a local layer of the network, an indication of a denial of service (DOS) attack directed at a system within the network; storing, in a database of the local layer, a configuration change corresponding to the DOS attack; sending, by a streamer device of the local layer and to a controller device of a global layer, the configuration change; storing, by the controller device, the configuration change in a database of the global layer, wherein the database of the global layer comprises stored configurations of the plurality of networking devices connected to the network; generating, by the controller device and based on the stored configurations in the database of the global layer, a plurality of configuration changes to send to the plurality of networking devices; storing, in the database of the global layer, the plurality of configuration changes; and sending, by the controller device of the global layer and to the plurality of networking devices, the plurality of configuration changes.

According to another broad aspect of the present technology, there is provided non-transitory computer-readable medium comprising computer-readable instructions that, upon being executed by a system, cause the system to receive, at a local layer of a network, an indication of a denial of service (DOS) attack directed at a system within the network; storing, in a database of the local layer, a configuration change corresponding to the DOS attack; sending, by a streamer device of the local layer and to a controller device of a global layer, the configuration change; storing, by the controller device, the configuration change in a database of the global layer, wherein the database of the global layer comprises stored configurations of the plurality of networking devices connected to the network; generating, by the controller device and based on the stored configurations in the database of the global layer, a plurality of configuration changes to send to the plurality of networking devices; storing, in the database of the global layer, the plurality of configuration changes; and sending, by the controller device of the global layer and to the plurality of networking devices, the plurality of configuration changes.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
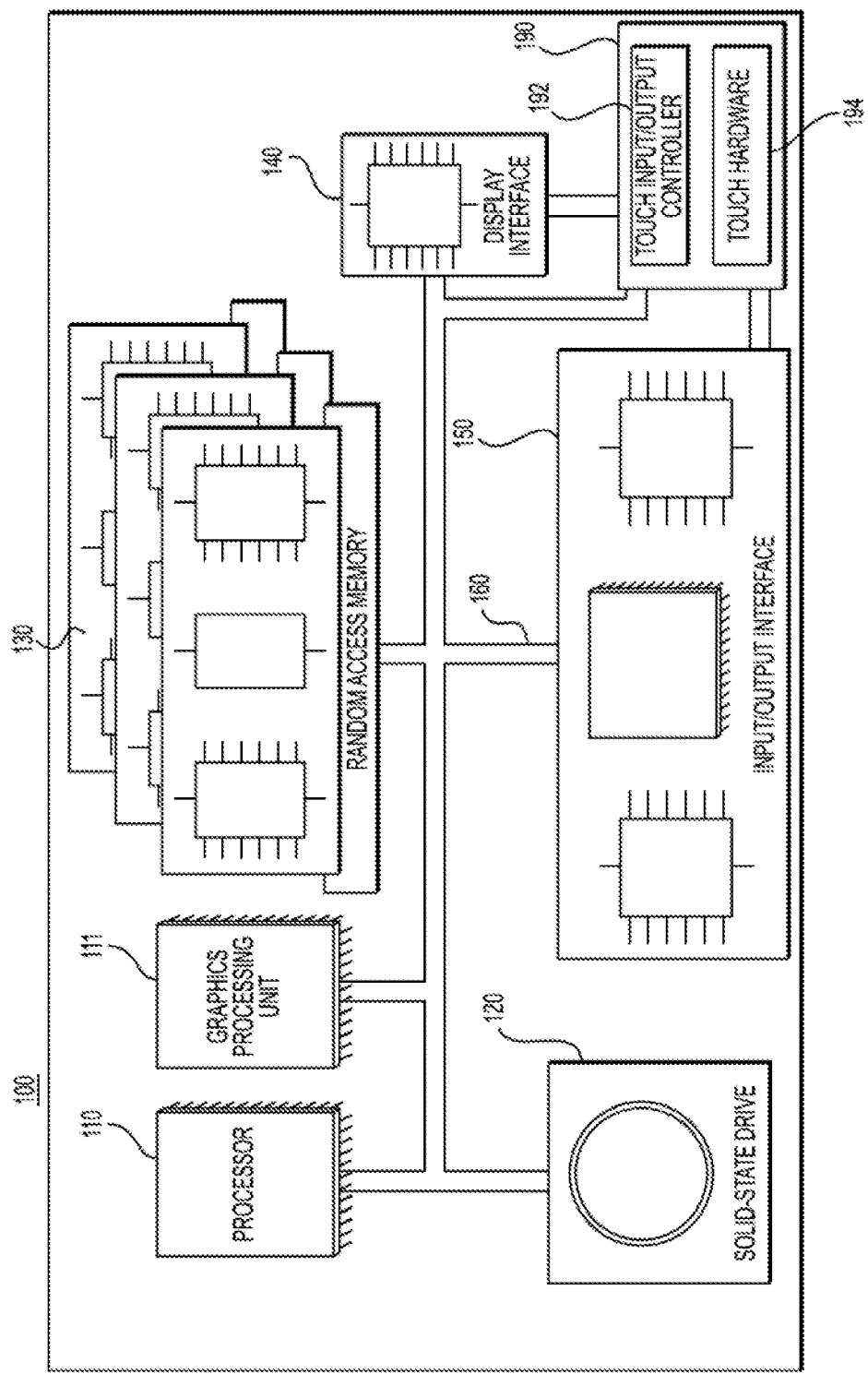
FIG. 1 is a block diagram of an example computing environment in accordance with various embodiments of the present technology.

It should be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and/or implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP) or quantum processing unit (QPU). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

In the context of the present disclosure, a Denial-of-Service (DOS) attack or Distributed Denial-of-Service (DDOS) attack refers to a malicious attack on a network, server, domain, and/or other target. A DDOS attack is a type of DOS attack in which numerous computers or machines flood a targeted resource.

With these fundamentals in place, we will now consider some non-limiting examples of the present technology.

Computing Environment

FIG. 1 illustrates a computing environment 100, which may be used to implement and/or execute any of the methods described herein. In some embodiments, the computing environment 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand.

In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Quantum Processing Units (QPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may enable networking capabilities such as wired or wireless network communications. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing environment 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Network with Local and Global Layers

Figure 2:
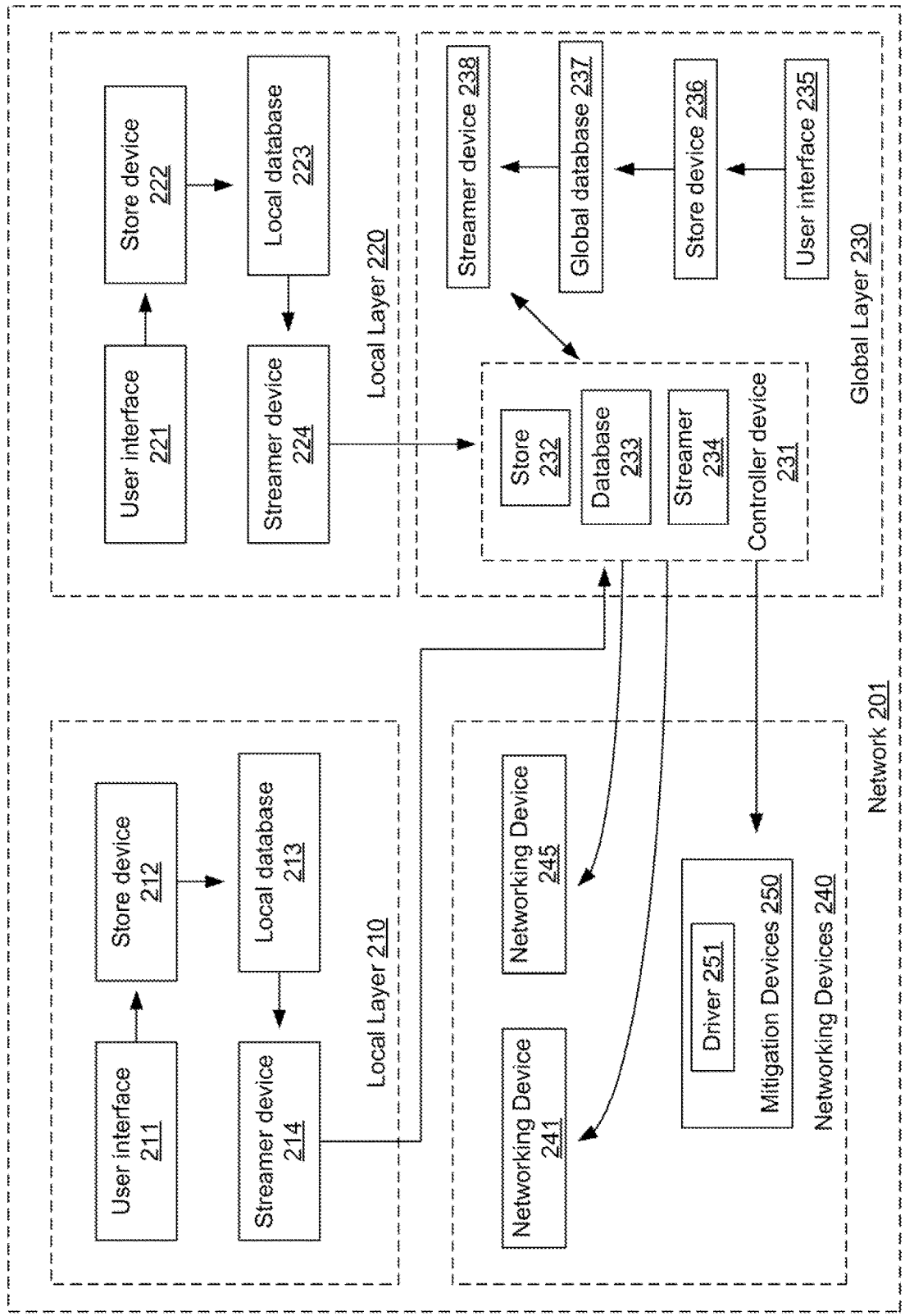
FIG. 2 is a block diagram of a network in accordance with various embodiments of the present technology.

FIG. 2 is a block diagram of a network 201 in accordance with various embodiments of the present technology. The network 201 may include servers, networking devices such as switches, routers, and firewalls, storage systems, and/or other components. The devices of the network 201 may be located in a single physical location or may be in multiple physical locations. Portions of the network 201 may be housed in data centers that are each located in different physical locations.

The network 201 may be organized in a virtual and/or physical manner. Devices of the network 201 may be organized into various "layers" which may or might not correspond to a physical location or geographical area. For example, all of the servers in a single datacenter may be grouped into a layer. In another example, all of the servers located in a single country may be grouped into a layer, even if those servers are in different datacenters. Different types of devices may be grouped into different layers. For example, all networking devices of the network 201 may be grouped into a single layer.

The network 201 includes a local layer 210, local layer 220, global layer 230, and networking devices 240. It should be understood that the network may have any configuration, such as any number of layers, devices, etc.

The local layer 210 may include a user interface 211, store device 212, local database 213, streamer device 214, and/or any other type of device that can communicate in a network. Although illustrated as separate devices, the user interface 211, store device 212, local database 213, and/or streamer device 214 may be implemented on any number of devices, may be implemented on a same device, and/or may be implemented as applications executing on one or more devices. The user interface 211, store device 212, local database 213, and/or streamer device 214 may be components of a microservice architecture.

The user interface 211 may be accessed by a user of the network 201, client of the network 201, administrator of the network 201, and/or any other authorized individual. The user interface 211 may be used to configure various aspects of the network 201. A client who is hosting a service in the local layer 210 may access the user interface 211 to administer the service. The client may be able to configure how traffic is routed through the network 201 to the service, how the service is executed within the network 201, and/or configure any other aspect of the service.

The user interface 211 may be accessed to indicate that an attack is expected and/or occurring on the network 201. The attack may be a DOS attack and/or any other type of attack. A user may select, via the user interface 211, which servers, services, network customers, etc. are believed to be affected by the attack. A user may input, via the user interface 211, a request to block certain traffic and/or direct the traffic to the mitigation devices 250. The user may input one or more rules for identifying traffic to be blocked or directed to the mitigation devices 250. For example, a user may indicate an external IP address and request that all traffic from that IP address be blocked. In another example, a user may indicate a group of servers within the network 201 and request that all traffic directed to those servers be sent to the mitigation devices 250. The user may input rules that are to be executed after an attack is detected. For example the user may indicate that, upon detection of an attack on the network 201, traffic directed to a specified address or service should be redirected to a mitigation device.

The store device 212 may write to and read from the local database 213. The local database 213 may store data for the local layer 210, such as information about the devices within the local layer 210, devices associated with the local layer 210 services provided by devices within the local layer 210, accounts associated with the local layer 210, and/or any other data regarding the local layer 210 and/or network 201. The local database 213 may contain configuration information for some or all of the devices in the local layer 210 and/or devices associated with the local layer 210. For example, firewall devices may be associated with the local layer 210. Any traffic directed at the devices within the local layer 210 may first pass through these firewalls.

The configuration information stored in the local database 213 may contain, for each device in the local layer 210, a current configuration of the device and/or a record of all changes made to the configuration of the device. Each change may include a version number, timestamp, and/or any other versioning information. The local database 213 may be any type of database, such as a MongoDB database.

The store device 212 may generate a rule based on input received from the user interface 211 and store the rule in the local database 213. For example, a rule may be generated that indicates that all traffic from a specified IP address should be blocked. The rule may then be applied to networking devices by a controller device, such as a controller device in the local layer 210 (not illustrated) or a controller device 231 in the global layer 230.

The streamer device 214 may communicate with the controller device 231 in the global layer 230. The streamer device 214 may send any changes that occur in the local database 213 to the controller device 231. After a rule is stored in the local database 213, or any other change is made to the local database 213 the streamer device 214 may transmit that change to the controller device 231. Any changes to the local layer 210 may be transmitted to the global layer 230.

Initially, the streamer device 214 may transmit the entire contents of the local database 213 to the controller device 231. After the contents of the local database 213 have been transmitted to the controller device 231, the streamer device 214 may follow any changes to the local database 213 and forward those changes to the controller device 231.

The local layer 220 may be similar to the local layer 210. The local layer 220 may have a user interface 221, store device 222, streamer device 224, and local database 223. Like in the local layer 210, the streamer device 224 of the local layer 220 may transmit the contents of the local database 223 to the controller device 231 of the global layer. Any changes to the local database 223 may be transmitted by the streamer device 224 to the controller device 231. In this manner the controller device 231 of the global layer 230 may receive an indication of every configuration change made within the local layers 210 and 220 of the network 201. The local layer 210 and the local layer 220 may be associated with different geographic areas. For example the local layer 210 may correspond to North America, and the local layer 220 may correspond to Europe.

The global layer 230 may contain devices that manage the entire network 201. The global layer 230 may include the controller device 231, a user interface 235, a store device 236, a global database 237, and/or a streamer device 238. Although FIG. 2 illustrates a single global layer 230, the network 201 may include multiple global layers. The network 201 may include any hierarchy of layers.

The controller device 231 may contain a store 232, database 233, and/or streamer 234. The controller device 231 may receive updates that occur at any databases of the local layers of the network 201, such as updates to the local database 213 and/or local database 223. The controller device 231 may store this information in the database 233 of the controller device 231. The database 233 may contain a copy of each of the local databases of the network 201. The database 233 may also include a record of changes to the local databases of the network 201.

The store 232 may write to and read from the database 233. The database 233 may store a configuration of some or all of the devices in the network 201. The database 233 may act as a cache, storing a copy of the whole configuration of each of the networking devices 240 that can be sent to any of the networking devices 240 that requests it. Even if part of the network 201 is offline and/or otherwise inaccessible, a networking device 240 can still retrieve its configuration from the controller device 231 because the configuration is stored in the database 233. The database 233 may store a record of changes made to the configurations of the devices in the network 201, such as a record of any rules that are sent to the devices in the network 201.

The user interface 235 may be similar to the user interface 211, except that it is used for indicating changes to the global layer 230 rather than a local layer. The user interface 235 may be used to input information related to an attack on the network 201 and/or a request for any other configuration change for the network 201. The input received by the user interface 235 may be sent to the store device 236. The store device 236 may write to and read from the global database 237. The global database 237 may store global data for the network 201, such as global configuration data.

The controller device 231 may subscribe to the global database 237. Anytime a change occurs at the global database 237, the streamer device 238 may send the change to the controller device 231. The local database 213, local database 223, and global database 230 may be any type of database, such as a MongoDB database.

After receiving an indication of a change to the local database 213, local database 223, and/or any other database or device in the network, the controller device 231 may determine that a configuration change is to be made to some or all of the networking devices 240 in the network 201. The streamer 234 of the controller device 231 may send a configuration change to a networking device 241, networking device 245, mitigation devices 250, and/or any of the other networking devices 240.

In order to send a configuration change to the networking device 241, the controller device 231 may retrieve a current configuration of the networking device 241 from the global database 237. The controller device 231 may then determine, based on the current configuration of the networking device 241, a configuration change to be applied to the networking device 241. The configuration change may apply a rule to the networking device 241.

After generating a configuration change for the networking device 241, the streamer 234 may send the configuration change to the networking device 241.

The controller device 231 may store the updated configuration of the networking device 241 to the global database 237. The controller device 231 may store an indication of each change that has been made to the networking device 241. The controller device 231 may be able to roll back any configuration changes that were made to the networking device 241. If a configuration change made to the networking device 241 causes an error to occur, the controller device 231 may cause the networking device 241 to revert to a prior configuration.

The controller device 231 may be able to check the integrity of any of the networking devices 240, such as any of the mitigation devices 250. In order to check the integrity of a mitigation device 250, the controller device 231 may retrieve the configuration of the mitigation device 250 that is stored in the global database 237. The controller device 231 may compare the configuration stored in the global database 237 to the actual configuration of the mitigation device 250. If the stored configuration does not match the actual configuration, an error may be reported. The networking device 241 may be reconfigured so that its configuration matches the stored configuration in the global database 237.

Similar to how the configuration of the networking device 241 is updated, the controller device 231 may retrieve a configuration of the networking device 245, receive a configuration change to be applied to the networking device 245, and send the configuration change to the networking device 245.

The controller device 231 may retrieve a current configuration of the mitigation devices 250. The controller device may determine, based on the current configuration of the mitigation devices 250, a configuration change to be applied to the mitigation devices 250. The controller device 231 may send the configuration change to the mitigation devices 250, and the mitigation devices 250 may apply the configuration changes. A driver 251 of the mitigation device 250 may push the configuration onto a dataplane of the mitigation device 250.

The configuration changes sent to the networking device 241, networking device 245, and/or mitigation devices 250 may include a rule or any other instructions for routing traffic through the network 201. The configuration changes may include addresses, such as IP addresses, to be added and/or removed from a blacklist. The blacklist may indicate that any packets received from the addresses on the blacklist are to be dropped. The configuration change may include a rule indicating types of traffic that are to be sent to the mitigation devices 250. The configuration changes may include profile updates for the plurality of networking devices 240.

The local layer 210 and/or local layer 220 may each contain a controller device (not illustrated). The controller device of the local layers 210 and/or 220 may have a same or similar configuration as the controller device 231. The controller device of the local layers 210 and/or 220 may configure networking devices of the respective local layer, such as networking devices that are exclusively associated with the respective local layer.

Figure 3:
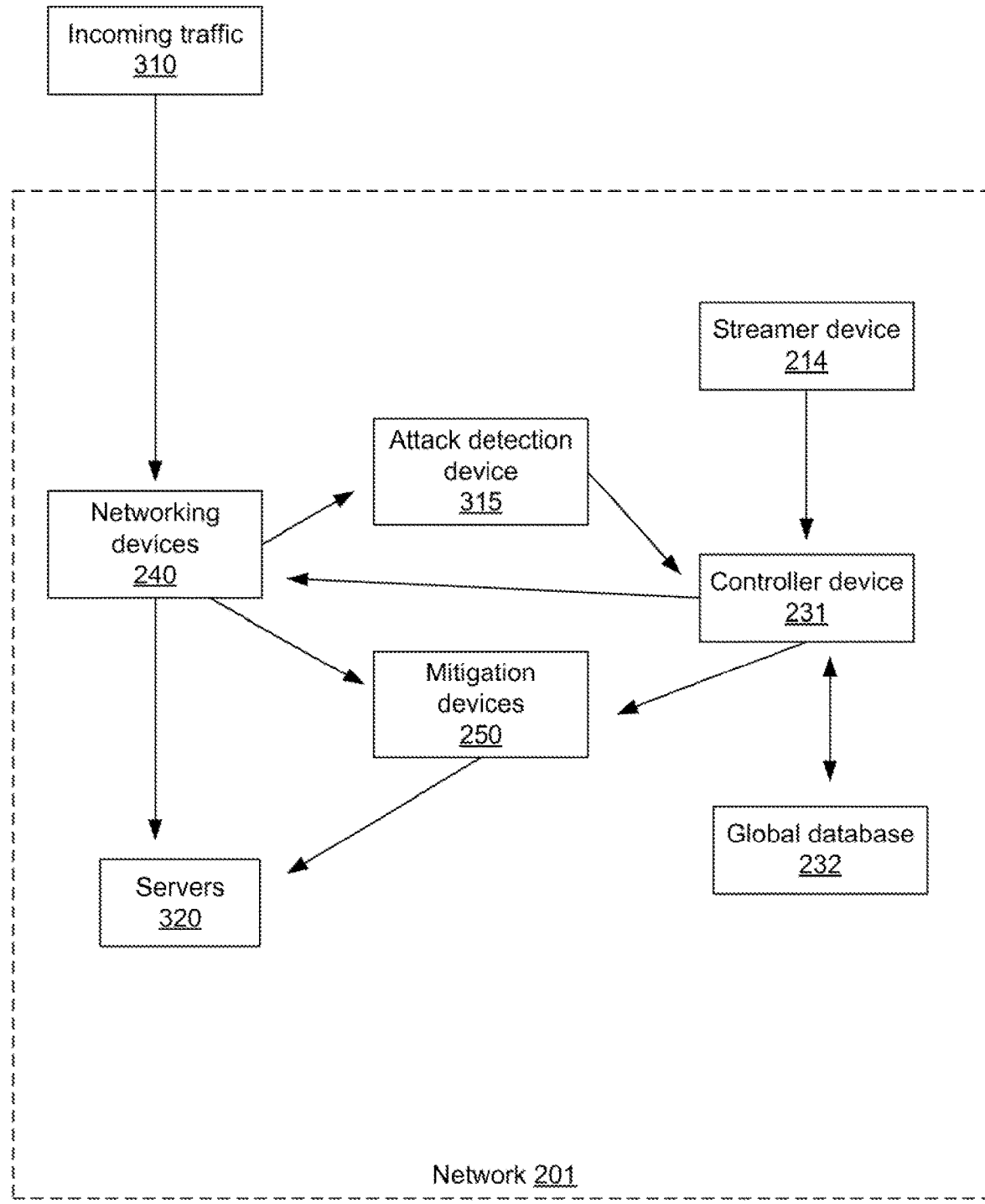
FIG. 3 illustrates a flow of communications in the network in accordance with various embodiments of the present technology.

FIG. 3 illustrates a flow of communications in the network 201 in accordance with various embodiments of the present technology. It should be understood that the communication flow illustrated in FIG. 3 is exemplary, and that the illustrated devices may communicate with each other in any manner. Each of the communication links illustrated in FIG. 3 may be bi-directional.

Incoming traffic 310 may originate from outside the network 201. Other incoming traffic (not illustrated) may originate within the network 201. The incoming traffic 310 may be any request received from outside of the network. The incoming traffic 310 may include a request to access a web site or other web resource (such as an HTTP GET request), a request to access a cloud service, and/or any other type of request. The request may include a domain name, destination address of a server or service within the network 201, port number, a request type, and/or any other information regarding the request.

The incoming traffic 310 may include traffic related to an attack on the network 201 or an attack on a server or service within the network 201. For example, during a DDOS attack, the incoming traffic 310 may include a large volume of requests from compromised devices. The traffic from the compromised devices may be directed at a service or domain hosted by servers within the network 201.

The incoming traffic 310 may be received by networking devices 240. The networking devices 240 may include firewalls, routers, switches, and/or any other type of networking devices. The networking devices 240 may route the incoming traffic 310 through the network 201 to the servers 320. When a packet from the incoming traffic 310 is received by the networking devices 240, the networking devices 240 may determine, based on information within the packet, which of the servers 320 the packet should be routed to. The networking devices 240 may then route the packet to the proper server of the servers 320.

An attack detection device 315 may monitor the incoming traffic 310 to detect an attack. The attack detection device 315 may watch for increases in the volume of incoming traffic 310, patterns in the incoming traffic 310 that resemble an attack, and/or may otherwise detect an attack in the incoming traffic 310. After detecting an attack, the attack detection device 315 may send an indication that an attack is occurring to a store device, such as one of the local layer store devices 212 and 222, or the global layer store device 236. The indication of the attack may then be stored in the corresponding database and forwarded to the controller device 231 by the corresponding streamer device. The indication may include details about where the attack is originating, what type of attack has been detected, the target of the attack, and/or any other information regarding the attack.

As described above, the streamer device 214, or any other streamer device within the network 201, may inform the controller device 231 of an attack and/or any other configuration change to be made to the network 201. The streamer device 214 may send a database update to the controller device 231 indicating that a configuration change is to be made to the network 201.

The controller device 231 may receive an indication of a configuration change to be made to the network 201 from the attack detection device 315, streamer device 214, and/or any other device within our outside of the network 201. The configuration change may be to respond to an attack, to anticipate a future attack, to adjust the network when an IP address is assigned to a new service, and/or for any other reason. As described above, the controller device 231 may determine configuration changes to send to the networking device 240.

The configuration changes from the controller device 231 may cause some of the traffic received by the networking devices 240 to be sent to the mitigation devices 250, rather than directly to the servers 320. The configuration changes may provide rules for identifying traffic to be sent to the mitigation devices 250. The configuration changes may include a rule to send any traffic originating from specified addresses, networks, geographic locations, etc. to the mitigation devices 250. The configuration changes may include a rule to send traffic that is directed to specified services, servers, domains, etc. to the mitigation devices 250. The rules may specify that the traffic affected by the rule is to be sent to the mitigation devices 250 or is to be blocked. If the traffic is blocked, those packets may be discarded by the networking devices 240 rather than being forwarded to other devices in the network 201. The networking devices 240 may contain a blacklist of addresses, where any traffic from addresses on the blacklist may be blocked.

Method for Configuring Networking Devices

Figure 4:
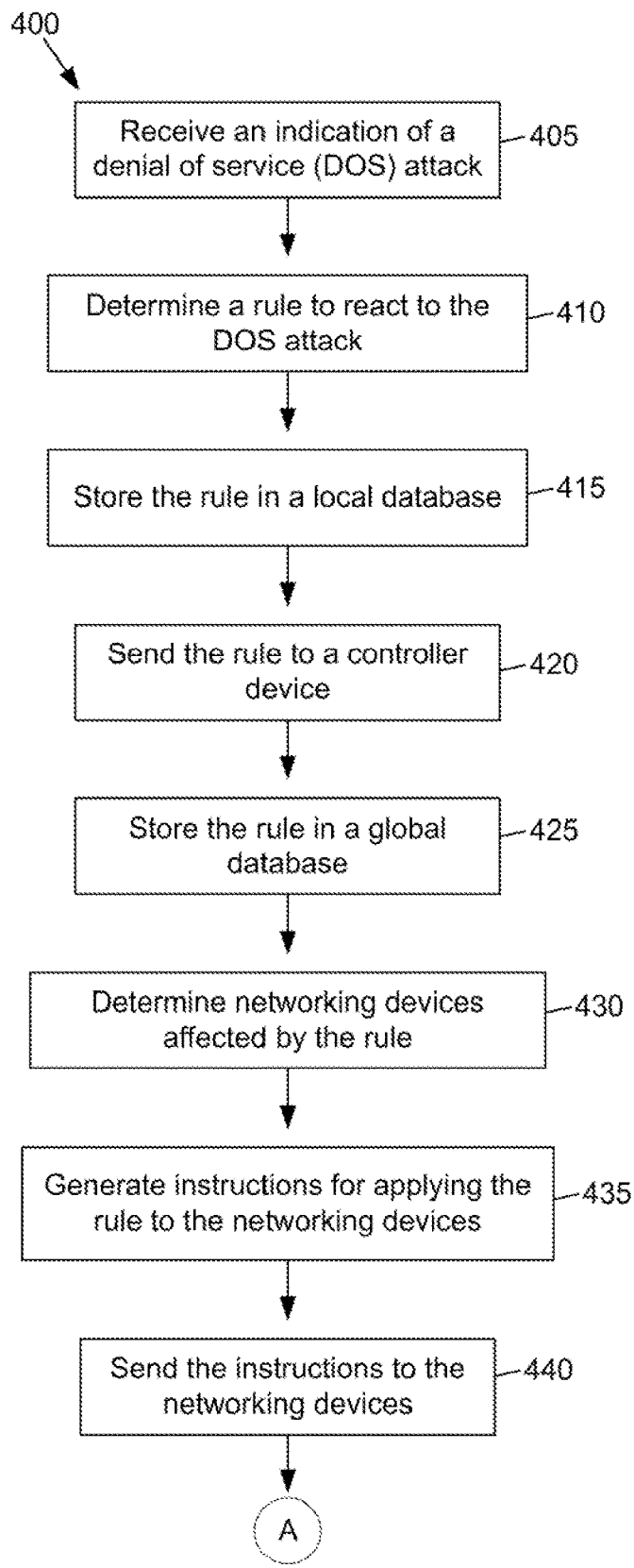
FIGS. 4 and 5 are a flow diagram of a method for configuring networking devices in accordance with various embodiments of the present technology.
Figure 5:
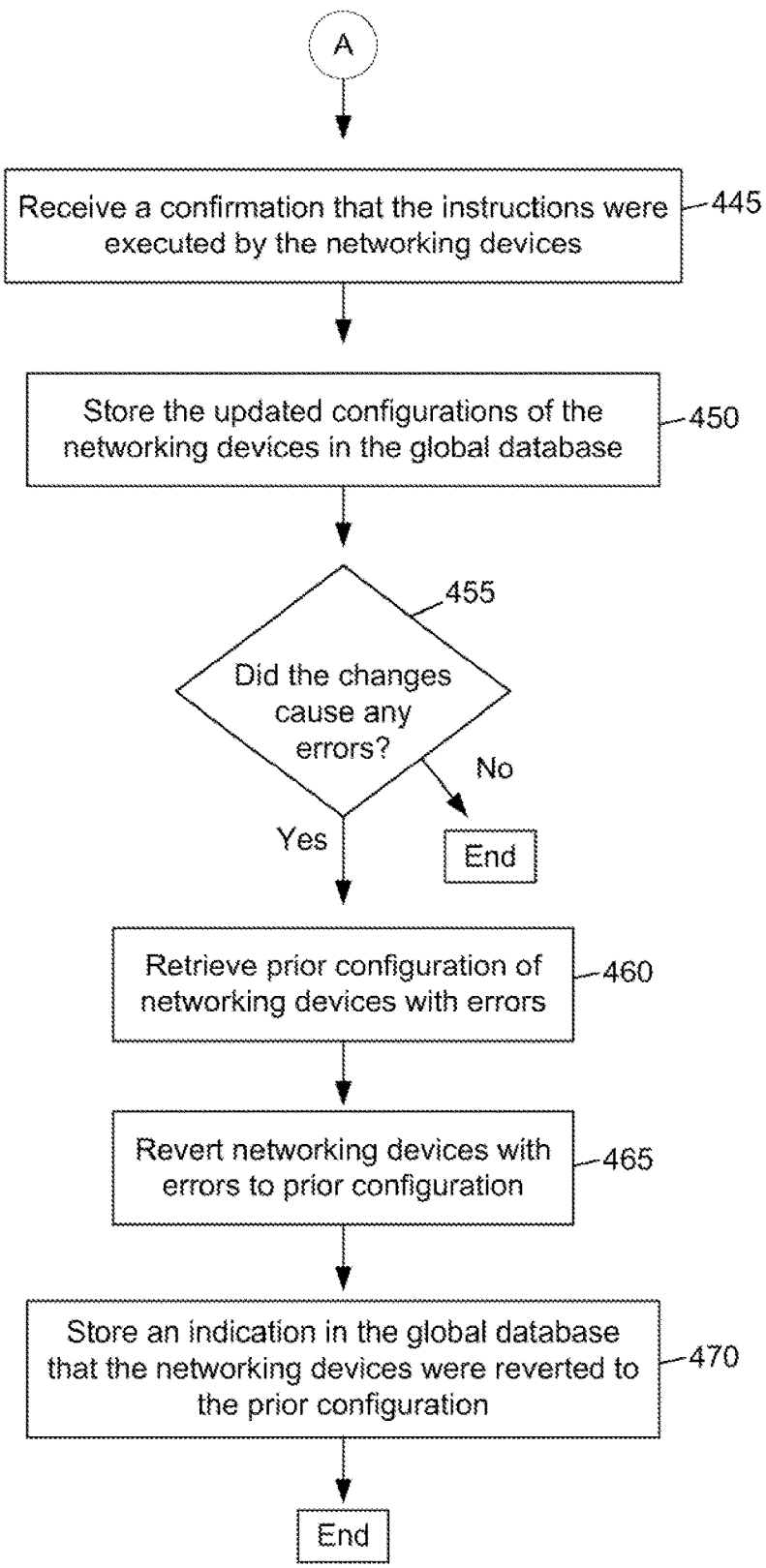

FIGS. 4 and 5 are a flow diagram of a method 400 for configuring networking devices in accordance with various embodiments of the present technology. All or portions of the method 400 may be executed by any of the devices illustrated in FIGS. 2 and 3, such as a store device, streamer device, database, controller device, networking device, mitigation device, and/or any other type of device in the network 201. In one or more aspects, the method 400 or one or more steps thereof may be performed by a computing system, such as the computing environment 100. The method 400 or one or more steps thereof may be embodied in computer-executable instructions that are stored in a computer-readable medium, such as a non-transitory mass storage device, loaded into memory and executed by a CPU. The method 400 is exemplary, and it should be understood that some steps or portions of steps in the flow diagram may be omitted and/or changed in order.

At step 405 an indication of a DOS attack, DDOS attack, any other type of attack, or a network configuration change may be received. The attack may be detected, such as by the attack detection device 315. The indication of the attack, or other configuration change, may be input by a user, such as via the user interface 211 or user interface 221. The indication of the attack may include details about the attack, such as a target of the attack, identification of the attacker, the type of attack, and/or any other details about the attack. The network configuration change may indicate a desired configuration change to the network, such as adding an address to a blacklist, changing how traffic is routed within the network, placing a server online or offline, and/or any other change to a network.

At step 410 a rule and/or other configuration change may be determined for responding to the attack. A mitigation profile may have been previously defined. The mitigation profile may indicate actions to be taken after an attack is detected, such as the rules and/or other configuration changes to be applied in response to an attack. The mitigation profile may be linked to services and/or addresses. The mitigation profile may cause traffic to the specified services and/or addresses to be re-routed after detecting an attack. The rule may be an instruction to block or redirect certain incoming traffic. Incoming packets may be filtered based on a source address, destination address, and/or any other feature of the packets. The packets that are filtered out may be directed to a mitigation device, may be blocked, discarded, may be further analyzed, and/or otherwise managed. The configuration change may be a global change to be applied to the entire network, and/or a local change to be applied to a specific layer of the network, such as the local layer 210 or local layer 220.

At step 415 the rule and/or other configuration change may be stored in a local database. A record of the rule may be stored in the local database, such as by the store device 212 or store device 222. A verification may be performed to ensure that the rule and/or other configuration change is consistent with the configuration rules of the corresponding layer. Rules corresponding to an individual user/customer may be isolated from impacting other users/customers and/or global settings for the network.

At step 420 the rule and/or other configuration change may be sent to a controller device. A streamer device, such as the streamer device 214 or streamer device 224, may be subscribed to the local database. The local database may send an indication to the streamer device of any changes made to the local database. The streamer device may send an indication to the controller device of the changes to the local database. The changes to the local database may include an indication of the rule or other configuration change that was stored at step 415.

At step 425 the rule and/or other configuration change may be stored in a global database. The global database may be part of the global layer of the network. The global database may store a configuration of all networking devices within the network. The rule and/or other configuration change may be stored in the global database by a controller device of the global layer, such as the controller device 231.

Steps 405-25 describe how a rule is received at a local layer and then stored at a global layer of the network. A rule may be received at the global layer, rather than the local layer. For example an attack detection device 315 may detect an attack and store a rule in the global database 237 to respond to the attack. The new rule stored in the global database may then be sent to any local databases of regions affected by the rule. The controller device 231 may detect the change to the global database 237, identify which local layers are affected by the change, and then send the change to the streamer devices of any local layers affected by the change.

At step 430 networking devices affected by the rule and/or other configuration change may be identified. The rule and/or other configuration change may indicate a change to be made to the network. In order to implement the rule and/or other configuration change, some or all of the networking devices in the network may be modified. The networking devices to be modified to implement the rule and/or other configuration change may be identified. For example if the rule and/or other configuration change applies to a specific layer of the network, all of the networking devices that manage traffic for that layer of the network may be identified, so that those networking devices can be reconfigured in order to implement the rule and/or other configuration change. The identified networking devices may include firewalls, routers, switches, mitigation devices, and/or any other type of networking devices.

At step 435 instructions may be generated for each of the networking devices identified at step 430. The instructions may be device-specific instructions for applying the rule and/or other configuration change to the device. The instructions may instruct the networking devices to apply the rule, apply a configuration change, add or remove an address from a blacklist, apply a new device profile, and/or any other type of instructions. A current device configuration may be retrieved from the global database for each of the devices identified at step 430. Using the current configuration of the devices, an instruction may be generated for each device in order to implement the rule and/or other configuration change. The instructions may be in any format that can be executed by the networking devices. The instructions may be in a Remote Procedure Call (RPC) format, such as GRPC.

At step 440 the instructions may be sent to the networking devices. The instructions may be sent by a controller device, such as the controller device 231, to the networking devices. The networking devices may then apply the rule and/or other configuration change in the instructions to their drivers. Using the steps described herein, a large number of networking devices can be rapidly reconfigured. For example thousands of networking devices may be reconfigured within seconds to respond to an attack on the network.

At step 445 the networking devices may transmit a confirmation that the instructions were executed. The networking devices may transmit the confirmations to a controller device.

At step 450 the updated configurations of the networking devices may be stored in the global database. The controller device may store an indication in the global database of the updated configurations of the networking devices. Each change made to the networking devices may be stored in the global database. Previous configurations of the networking devices may be stored in the global database. The global database may implement versioning. Each change to a configuration may be stored in the database with a version number, timestamp, and/or any other indication of a version corresponding to the change. The database may form a changelog indicating all configuration changes that have been made to each of the networking devices. The changelog may be used for traceability, accounting, and/or rolling back devices to previous configurations.

At step 455 a determination may be made as to whether the instructions have caused any errors. Errors may be detected at individual devices and/or for the entire network. An error may be detected if a device is malfunctioning, if packets are not being routed correctly, etc. The integrity of a networking device may be determined by comparing a current configuration of the networking device with the configuration of the networking device that is stored in the global database. If the current configuration of the networking device does not match the configuration of the networking device that is stored in the global database, an error may be detected and the method 400 may proceed to step 460. If no errors are detected at step 455, the method 400 may end. If an error is detected at step 455, the method may continue to step 460 to address the error.

At step 460 the networking devices experiencing errors and/or affected by errors may be identified. The configuration changes to these devices may be reverted in order to address the error. Rather than identifying networking devices affected by errors, all of the networking devices identified at step 430 may be reverted to their prior configuration. By reverting all of the networking devices to a prior configuration, the rule and/or other configuration change that was applied to the networking devices may be removed.

At step 465 the networking devices identified at step 460 may be reverted to a prior configuration. For each device, an instruction may be generated that reverts the device to a prior configuration. To generate the instruction for a device, the instruction that was sent to the device at step 440 may be retrieved. Then, an instruction that reverses the effects of that prior instruction may be generated and sent to the device. A previous version of the networking device's configuration may be retrieved based on the version number. The configuration with the prior version number may then be applied to the networking device.

At step 470 an indication may be stored in the global database indicating that the networking devices were reverted to the prior configuration. A current configuration of the networking devices stored in the database may be updated to indicate that the networking devices were reverted to the prior configuration. After updating the database, the method 400 may end.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

The invention claimed is:

1. A method for configuring a plurality of networking devices in a network having a local layer and a global layer, the method comprising:
    receiving, at the local layer, an indication of a denial of service (DOS) attack directed at a system within the network;
    storing, in a database of the local layer, a configuration change corresponding to the DOS attack;
    sending, by a streamer device of the local layer and to a controller device of the global layer, the configuration change;
    storing, by the controller device, the configuration change in a database of the global layer, wherein the database of the global layer comprises stored configurations of the plurality of networking devices connected to the network;
    generating, by the controller device and based on the stored configurations in the database of the global layer, a plurality of configuration changes to send to the plurality of networking devices;
    storing, in the database of the global layer, the plurality of configuration changes; and
    sending, by the controller device of the global layer and to the plurality of networking devices, the plurality of configuration changes.

2. The method of claim 1, further comprising:
    determining that a configuration change of the plurality of configuration changes caused an error at a networking device of the plurality of networking devices;
    retrieving, by the controller device and from the database of the global layer, a prior configuration of the networking device; and
    causing, by controller device, the networking device to revert to the prior configuration.

3. The method of claim 1, wherein the plurality of configuration changes comprise an address to add to a blacklist.

4. The method of claim 1, wherein the plurality of configuration changes comprise profile updates for the plurality of networking devices.

5. The method of claim 3, wherein the plurality of configuration changes cause incoming traffic corresponding to the address to be directed to one or more mitigation devices.

6. The method of claim 1, wherein receiving the indication of the DOS attack comprises receiving user input indicating that a DOS attack is occurring.

7. The method of claim 1, wherein the streamer device is configured to send any changes that are made to the database of the local layer to the controller device of the global layer.

8. The method of claim 1, wherein generating the plurality of configuration changes to send to the plurality of networking devices comprises, for each networking device of the plurality of networking devices:
  retrieving, from the database of the global layer, a current configuration of the respective networking device; and
  determining, based on the current configuration of the respective networking device and based on the configuration change in the database of the global layer, a device-specific configuration change to be applied to the respective networking device.

9. The method of claim 1, wherein sending the plurality of configuration changes to the plurality of networking devices comprises sending, to a plurality of drivers associated with the plurality of networking devices, the plurality of configuration changes.

10. The method of claim 9, further comprising applying, by the plurality of drivers, the plurality of configuration changes to the plurality of networking devices.

11. A system for network configuration, the system comprising a controller and a memory storing a plurality of executable instructions which, when executed by the controller, cause the system to perform the method of claim 1.

12. A non-transitory computer-readable medium comprising computer-readable instructions that, upon being executed by a system, cause the system to perform method of claim 1.

* * * * *